United States Patent [19]

Grudelbach

[11] 3,925,681

[45] Dec. 9, 1975

[54] MONITORING, COUNTING AND SAFETY APPARATUS

[76] Inventor: Hans-Dieter Grudelbach, Seestrasse 10, Plon, Germany

[22] Filed: Mar. 11, 1974

[21] Appl. No.: 450,221

[30] Foreign Application Priority Data

Mar. 13, 1973 Germany............................ 2312375

[52] U.S. Cl............... 307/117; 340/258 B; 250/221
[51] Int. Cl.²......................................... G01D 21/04
[58] Field of Search.................... 307/117, 115, 116; 317/125, 135 R; 328/5; 340/259, 258 B; 250/221, 222 PC, 224, 222 R

[56] References Cited
UNITED STATES PATENTS

| | | | |
|---|---|---|---|
| 3,409,842 | 11/1968 | Embling et al...................... | 307/116 |
| 3,746,863 | 7/1974 | Pronovost........................... | 250/221 |
| 3,792,458 | 2/1974 | Smith et al.......................... | 340/259 |
| 3,825,745 | 7/1974 | Thomson............................ | 250/221 |

*Primary Examiner*—Robert K. Schaefer
*Assistant Examiner*—M. Ginsburg

[57] ABSTRACT

This invention relates to apparatus for surveillance, counting and guard purposes of the kind in which emitters emit electrical beams or radiation or jets of water to appropriately responsive reception means, one receiver being associated with one emitter, the arrangement being such that when a body representing a triggering occurrence enters the beam path between an emitter and a receiver, and thus interrupts at least one of said beam paths, it causes an apparatus for interpreting the triggering occurence to respond via the receiver or receivers thus affected, so that the interpreting apparatus will then halt an operation taking place in a machine, set off an alarm or cause the triggering occurrence to be counted. According to the invention, one receiver and one emitter are connected together in each case to form an independent channel: all the similarly formed channels constitute a ring circuit such that, as a result of the beam paths being suitably arranged, the receiver in each channel responds only to radiation foreign to its channel coming from the emitter of a channel adjacent to it in the ring circuit in the form of the latter's own radiation: the circuitry for each channel is such that its emitter is caused to produce radiation for as long a time as its receiver is not receiving foreign radiation but on the other hand emission is interrupted for the time that the receiver receives foreign radiation: an interpreting apparatus is connected to the ring of channels which, when at least one of the beam paths is interrupted by a triggering occurrence, responds by interpreting a transition on the part of the circuit from its dynamic operational state to a static state.

4 Claims, 2 Drawing Figures

MONITORING, COUNTING AND SAFETY APPARATUS

BACKGROUND OF THE INVENTION

The present invention relates to apparatus for surveillance, counting and guard purposes of the kind which consists of emitters to emit jets or radiation and receivers responsive to such jets or radiation, one of which is associated with each emitter such that when a body representing a triggering occurrence enters the beam paths between emitter and receiver and interrupts at least one of the beam paths, it causes via the receiver or receivers thus affected, an apparatus for interpreting the triggering occurrence to respond so that the apparatus will halt an operation taking place in a machine, set off an alarm, cause the triggering occurrences to be counted, etc.

Apparatus of this kind may, for example, be used to guard rooms, or to guard dangerous areas of machinery by acting as a protection for the operator standing at the machine by ensuring that any operation of the machine which may possibly represent a danger to the operator is at once interrupted and halted if the operator should, for example, put his hand into the guarded area. In this case the hand which enters the danger area would represent the triggering occurrence.

Such safety apparatus has been particularly successful in paper-cutting machines in which such apparatus is arranged in the immediate vicinity of the cutter in the form of a light barrier and in such a case it may consist of photocells with light sources arranged opposite them. Its guarding function is exerted by switching off the drive to the cutter when a beam path extending between light emitter and light receiver is interrupted by, for example, somebody's hand.

Surveillance apparatus along the same lines as these light barriers is also used for guarding large spaces against entry by unauthorised persons or even for guarding individual articles. Another area of application is the counting of articles moving in a specific direction, on conveyor belts for example. In this case the articles which enter the area covered by the light barrier, which now functions as a counting apparatus, act as the occurrences which trigger the counting process by causing an interpreting apparatus to carry out a counting action each time an article passes through one of the beam paths.

A major problem with such apparatus is testing that it is operating reliably and that it is at all times functioning properly, since the failure of a guard arrangement in a danger area of a machine for example may have extremely unpleasant consequence.

Surveillance apparatus used at present is therefore generally tested at specific times. The procedure adopted for this may be that the time appointed for testing is at the beginning of the guarding process, that is to say it is established that a state of proper function exists when for example the surveillance apparatus is switched on or when the part of the machine which may represent a source of danger begins to operate. If this means of testing is not sufficiently reliable in view of the importance attaching to the guard function, a test is made subsequent to each triggering occurrence occurring, in which case no fault should occur between this test and the next safety check which takes place.

If it is still not sufficiently certain that any fault in the surveillance apparatus will be discovered in this way, then the point in time at which a state of proper function is tested for should be transferred to a point preceding or located directly at the beginning of the next triggering or initiating occurrence which is to be monitored and detected. The time during which an unnoticed fault can occur can be even further reduced in this way. This of course is equivalent to an increase in reliability.

Testing for proper function usually takes the form of an actual or simulated switching-off of the beam source. If the apparatus proves to be functioning properly then this occurrence is interpreted in the same way as would be, for example, a person's hand entering the danger area of a machine or a person or an object entering the area over which surveillance is being kept.

In the case of surveillance apparatus which employs a plurality of beam paths it is necessary as a rule to establish that the beam paths for all the beams are unobstructed. In testing it is therefore necessary to discover whether each individual beam is able to perform its surveillance function. This requirement can be met by allowing each individual beam to take on the job of surveillance. However, so that operation is not interrupted during testing, it is then necessary for another beam to cancel out the effects of cutting out beams. This introduces a new source of unreliability since in principle additional monitoring means are required to monitor the cancelling surveillance means. Another possible way of checking for proper function is to choose to do this at a point in time when surveillance is not required. A simulated interruption to all the beams is then produced at this time. To do this, it is then of course necessary to consider the surveillance function of all the beams as a whole but this does not allow the functional state of each of the beams involved to be determined with any degree of certainty.

The result of this is that continuous checking and testing of the proper functioning of the apparatus is an extremely difficult problem.

Object of the invention therefore consists in seeking a solution to this problem and in providing an apparatus which, while uncomplicated, makes it possible for a continuous, automatic and reliable check to be made for proper function and which always subjects every component to this check.

SUMMARY OF THE INVENTION

To achieve this object, the apparatus described above is so constituted in accordance with the invention that a receiver and an emitter are connected together to form one independent channel in each particular case. All the similarly formed channels constitute a ring circuit as a result of the fact that, by arranging the beam paths in a suitable way, the receiver of each channel will only respond to radiation foreign to its channel which comes from the emitter associated with a channel next to it in the ring of channels in the form of the latter's own radiation. The circuitry for each channel is such that on the one hand its emitter is caused to produce radiation for as long a time as its receiver is not receiving foreign radiation and on the other hand that emission is interrupted for the time the receiver receives foreign radiation. An interpreting apparatus is connected to the ring of channels which, when at least one of the beam paths is interrupted by a triggering occurrence, responds by interpreting a transition on the part of the circuit from its dynamic operational state to a static state.

When the apparatus is switched on, all the emitters will be active initially and, since the emitters are activated, they will emit radiation or beams when their associated receivers are not subject to radiation. One of the receivers will be the first to transmit to the emitter associated with it in the channel the information that it is receiving radiation, as a result of which the emitter will be instructed to cease emitting radiation. The current to the emitter is cut off accordingly. As a result of this and the resultant absence of foreign radiation, the receiver opposite this emitter, which is situated next after it in the ring of channels, receives the information that it should again switch on the emitter associated with it, which emitter was then and beforehand switched off.

It will be understood that this continuous alternation between switched-on and switched-off emitters takes place periodically and progressively in one direction through the whole ring of channels, the function of initiating the test for proper functioning being passed on continuously from one channel to the next. Since the ring of channels or in other words the circuit as a whole behaves dynamically it is useful for the information or results of testing also to be transmitted dynamically, via a transducer situated in the ring of channels after which a rectification takes place. The result of an article coming between the emitter and receiver of neighbouring channels (whether this is when the apparatus is operating normally or whether it is done for testing purposes) or even the result of a component becoming inoperative, is that a static condition comes into being in all the channels and the subsequent dynamic output announces the existence of a condition which is interpreted as indicating the occurrence of a triggering event or of a fault in the apparatus.

DESCRIPTION OF THE DRAWINGS

In order that the invention may be more clearly understood, one embodiment thereof will now be described in conjunction with the accompanying schematic drawings in which.

DESCRIPTION OF A PREFERRED EMBODIMENT

Figure 1:
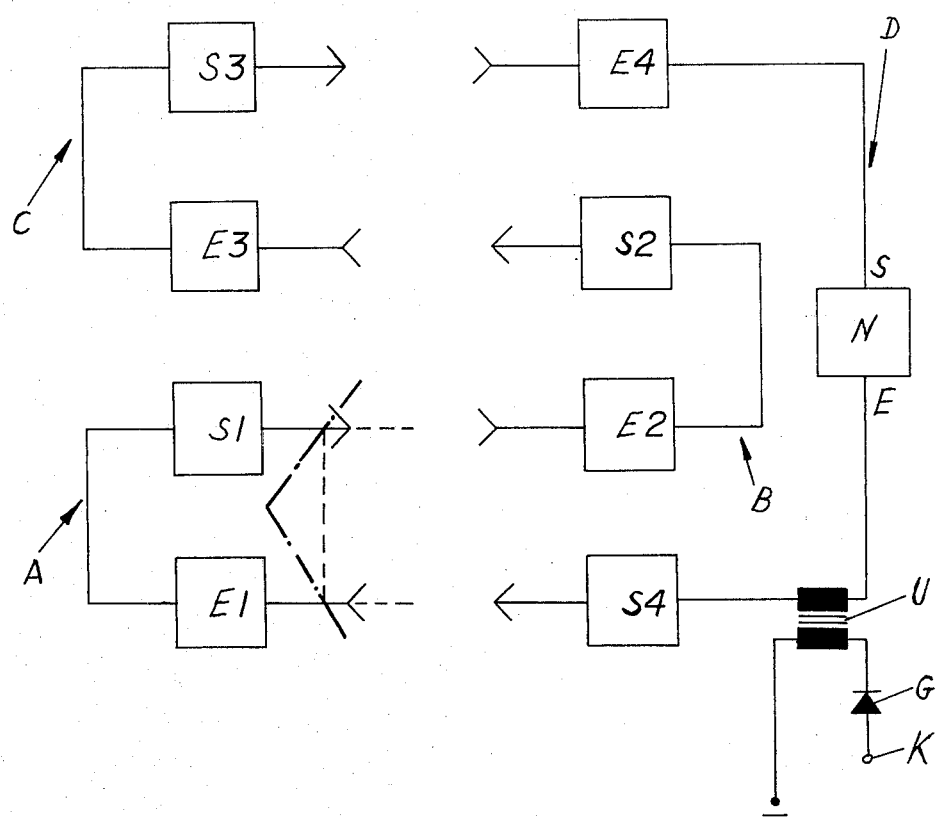
FIG. 1 is a block diagram of a surveillance apparatus according to the invention.

Referring now to the drawings, in the surveillance apparatus shown schematically in FIG. 1, there are provided a total of four channels A to D each of which consists of a receiver E and an emitter S, each designated with a subscript, which are combined in a ring-circuit in such a way that in each case the emitter and the receiver of neighbouring channels are situated opposite one another.

Between the emitter and receiver of channel D is inserted a simulator N which is intended to simulate a further channel or beam path electrically, with the result that from the circuitry point of view there are a total of five channels. Having an odd number of channels produces a large phase angle with respect to oscillation frequency and this is necessary if the oscillatory or dynamic behaviour of the circuit is to be satisfactory. If this were not so the natural frequency of oscillation would be too high and this would result in the circuit being relatively insensitive. Part of the interpreting apparatus is a transformer U inserted in channel D, in the secondary circuit of which is inserted a rectifier G.

As mentioned above, each channel has the characteristic that it emits beams or radiation when not receiving such beams of radiation from the neighbouring channel. This means that, immediately after the apparatus is switched on, all the emitters at first begin to radiate due to the fact that, directly after the switching-on operation, their associated receivers in the channels are not receiving any radiation. Since the components forming the channel naturally cannot all be identical, one of the receivers will be the first to receive radiation when the apparatus is switched on and will transmit to its emitter the information that it is receiving radiation. The result of this will be that it switches off its emitter.

If is assumed that receiver E in channel A for example is the first to receive radiation from emitter S in channel D, emitter S in channel A is deprived of current and no longer emits. As a result of this, receiver E in channel B receives instructions to switch on its associated emitter S again, as a result of which receiver E in channel C then cuts off the current to its emitter S and blocks the emitter. Instructions are then passed in the same way to channel D and thence back to channel A with the result that the circuit is in an oscillatory state. At its secondary side, transformer U gives out a pulsed A.C. voltage which is rectified by rectifier G into a pulsed D.C. voltage which can be extracted and analysed at output terminal K. If a disturbance occurs, which may be produced deliberately or involuntarily as a result of the beam path between the transmitter and receiver of adjacent channels being interrupted, the circuit changes from a dynamic to a static state, which fact becomes apparent from the appearance of a constant D.C. voltage level at terminal K and is interpreted accordingly. Various known circuits may be used for this interpreting process but there is no need for them to be described in detail here. It should merely be ensured that the interpreting apparatus will detect the transition on the part of the circuit from its normal dynamic state to a static condition and that a control process will then be set in motion, this process for example stopping a dangerous operation being carried out by a machine by switching off the drive to the machine, or setting off an alarm device, or operating a counter, etc. At the same time the apparatus is continuously and automatically checked for proper functioning since any major disturbances in the circuitry result in the beam paths in the ring-circuit being broken at one or more points.

Figure 2:
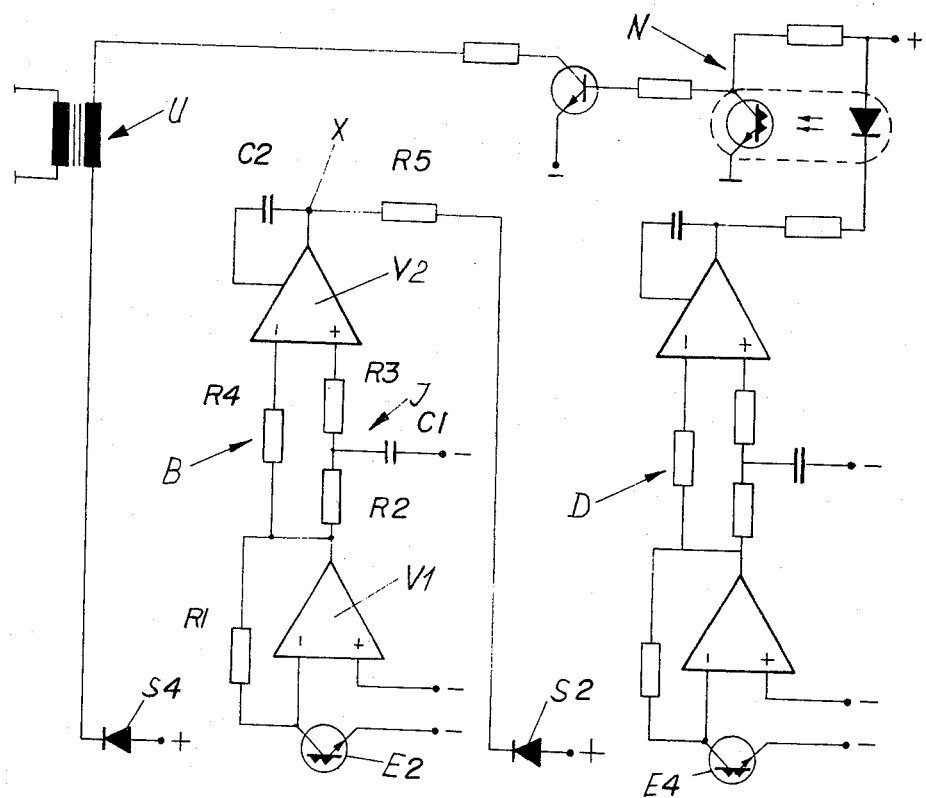
FIG. 2 shows the electrical circuitry of the surveillance apparatus of FIG. 1.
Figure 2:
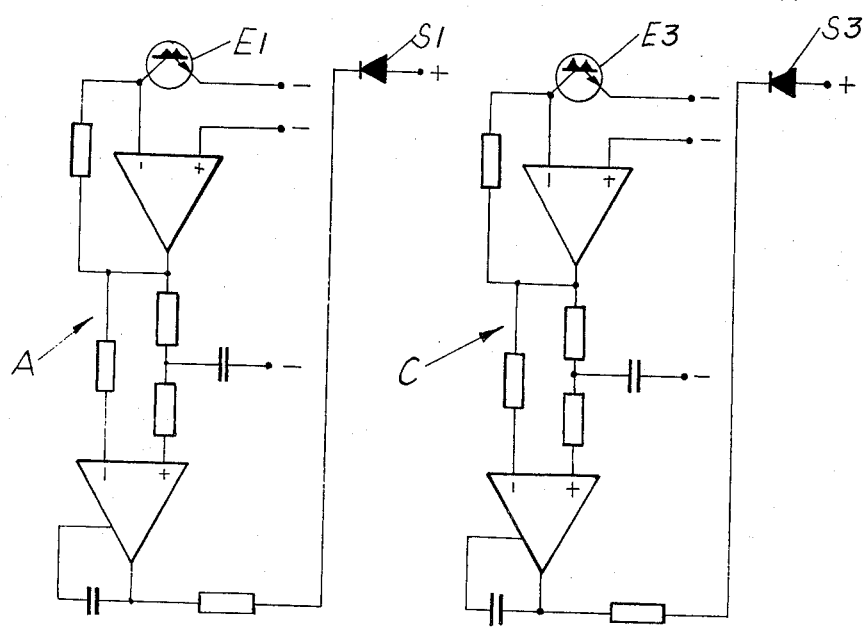

FIG. 2 shows an example of a circuit for the layout shown in FIG. 1. The receiver/emitter channels A to D are all constructed in the same way. The way in which the circuit operates will be explained by taking channel B as an example. Like the other channels, this channel has a photo-transistor as its receiver E, this receiver being orientated towards emitter S of channel A, which takes the form of an emitter diode, and being able to receive the radiation from this emitter, which in this case is photo-electric radiation. An input feedback amplifier V1 processes the information from receiver E, the residual voltage at the output of V1 being suppressed by feeding this same potential to the two inputs of a final amplifier V2 which operates as a differential amplifier, as a result of which a quiescent state exists at the output of V2 if there is no alteration in the output voltage from V1 of a higher level than the response level of V2.

Due to the fact that the voltage is integrated by the integrating circuit J at the positive input of amplifier V2 its response level of V2 must be exceeded within a specific time if there is to be an alteration of condition at output X of V2 as a consequence and this is only possible when the beam paths are sufficiently unobstructed.

The principle on which a channel operates is that the voltage at output X fixes the operating point of the associated emitter S so that the emitter will remain in operation all the time the receiver E is not receiving radiation. On the other hand, when receiver E receives foreign radiation the working voltage at point S is controlled in such a way that emitter S is deprived of current and no longer emits.

In the example in FIG. 2, simulator N is shown as a photocouple, while the primary winding of transformer U is situated between the simulator and emitter S of channel D.

Finally, it should be pointed out that basically any possible types of radiation or jet emitters may be considered for use as emitters, even, inter alia, devices which emit jets of water and opposite which are arranged receivers which respond to water pressure. The possibility also exists of arranging receiver/emitter channels on only one side of the area over which surveillance is kept and replacing for example channels A and C shown in FIG. 1 by a mirror (shown in chain lines) which causes the incident beam to follow the path shown in broken lines.

I claim:

1. Detecting apparatus comprising a plurality of emitters which are capable of emitting a signal beam across a space to be subject to surveillance, a receiver connected to and adapted to control each respective emitter, each pair of connected emitters and receivers forming a separate channel, the respective channels of emitter and receiver pairs being physically located to form a complete ring circuit wherein the receiver of one channel receives a beam signal from an emitter of an adjacent channel, first circuit means in each channel adapted to stop operation of a respective emitter as long as its respective receiver is receiving a signal beam from the emitter of the adjacent channel, second circuit means in each channel to start operation of a respective emitter as long as its respective receiver fails to receive a signal beam from the emitter of the adjacent channel, and interpreting means connected in the channel ring operable in response to change of state of the circuit for interpreting by signal the state of the circuit, the number of channels of said ring circuit being selected to produce the most desirable natural frequency of oscillation of the circuit when in operation.

2. Apparatus as claimed in claim 1 wherein the number of channels of said ring circuit is an odd number.

3. Apparatus as claimed in claim 1 wherein the number of channels of said ring circuit is an even number and the apparatus comprises one additional channel in the form of a simulator having the same characteristics as a regular channel.

4. Apparatus as claimed in claim 1 wherein each respective emitter comprises an emitter diode and each respective receiver comprises a photo-transistor having an operating point which is controlled as a function of whether the receiver is receiving a signal.

* * * * *